United States Patent [19]

Rabe et al.

[11] Patent Number: 4,475,440
[45] Date of Patent: Oct. 9, 1984

[54] POWER STEERING CONTROL APPARATUS

[75] Inventors: William T. Rabe; Jim L. Rau, both of Lafayette, Ind.

[73] Assignee: TRW Inc., Cleveland, Ohio

[21] Appl. No.: 441,503

[22] Filed: Nov. 15, 1982

[51] Int. Cl.³ .............................................. F15B 9/10
[52] U.S. Cl. .................................. 91/375 A; 91/416;
 91/422; 91/450; 91/464; 92/110
[58] Field of Search ................ 91/375 A, 375 R, 464,
 91/391 R, 378, 519, 416, 449, 450; 92/79, 109,
 110; 180/132

[56] References Cited

U.S. PATENT DOCUMENTS

| 3,733,968 | 5/1973 | Boch | 91/391 R |
| 3,832,849 | 9/1974 | Lang | 91/519 |
| 3,918,544 | 11/1975 | Jablonsky et al. | 91/380 |
| 3,935,790 | 2/1976 | Goff | 92/79 |

FOREIGN PATENT DOCUMENTS

| 833172 | 4/1960 | United Kingdom . |
| 1099986 | 1/1968 | United Kingdom . |
| 1195710 | 6/1970 | United Kingdom . |
| 1285627 | 8/1972 | United Kingdom . |
| 1593019 | 7/1981 | United Kingdom . |

OTHER PUBLICATIONS

Drawings from U.S. Application Serial No. 386,907, filed Jun. 10, 1982, by William T. Rabe and Maurice P. Roberts, entitled "Steering Apparatus".

Primary Examiner—Paul E. Maslousky
Attorney, Agent, or Firm—Yount & Tarolli

[57] ABSTRACT

An improved power steering control apparatus includes a power steering motor having a piston rod which extends through one end of the motor cylinder. This results in the rod end of the piston having a smaller working area than the head end of the piston. In order to equalize the fluid pressure forces on opposite sides of the piston when the motor is in an inactive condition, a power steering control valve vents both sides of the piston to atmospheric pressure when the control valve is in a neutral or unactuated condition. Three conduits are connected with the control valve; a supply conduit which conducts fluid from a pump to the control valve to effect operation of the motor upon actuation of the control valve; a return conduit through which fluid is returned to a reservoir when the control valve is in the neutral condition; and a vent conduit which connects the control valve and opposite sides of the motor cylinder piston directly with the reservoir and atmospheric pressure when the control valve is in the neutral condition.

21 Claims, 7 Drawing Figures

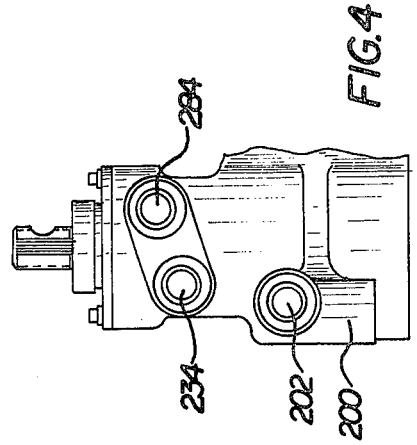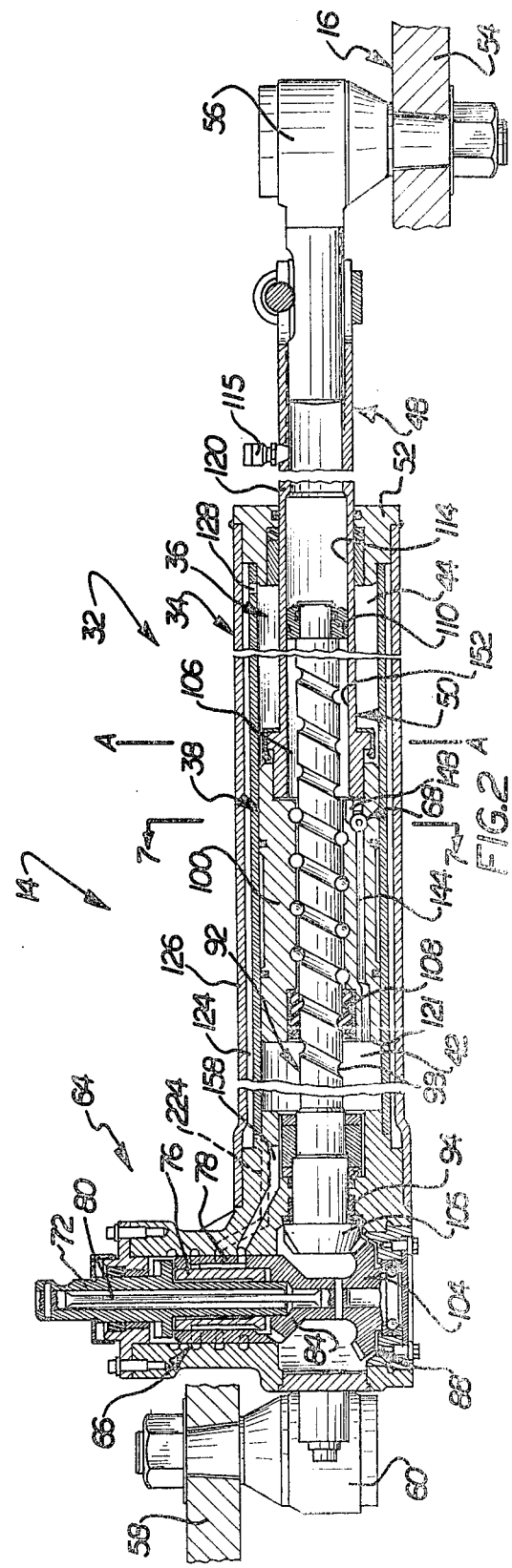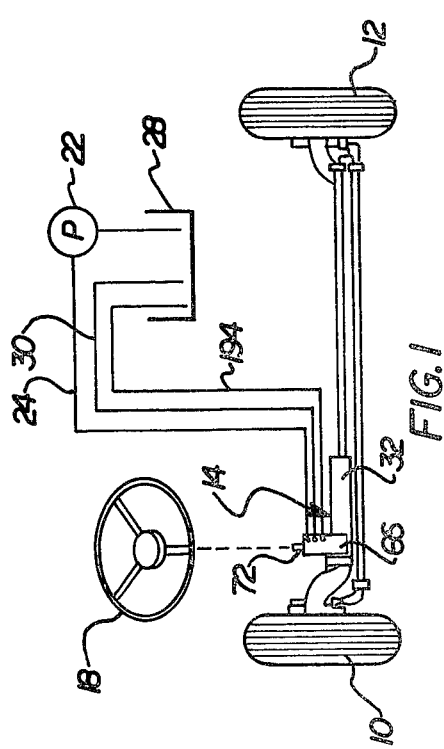

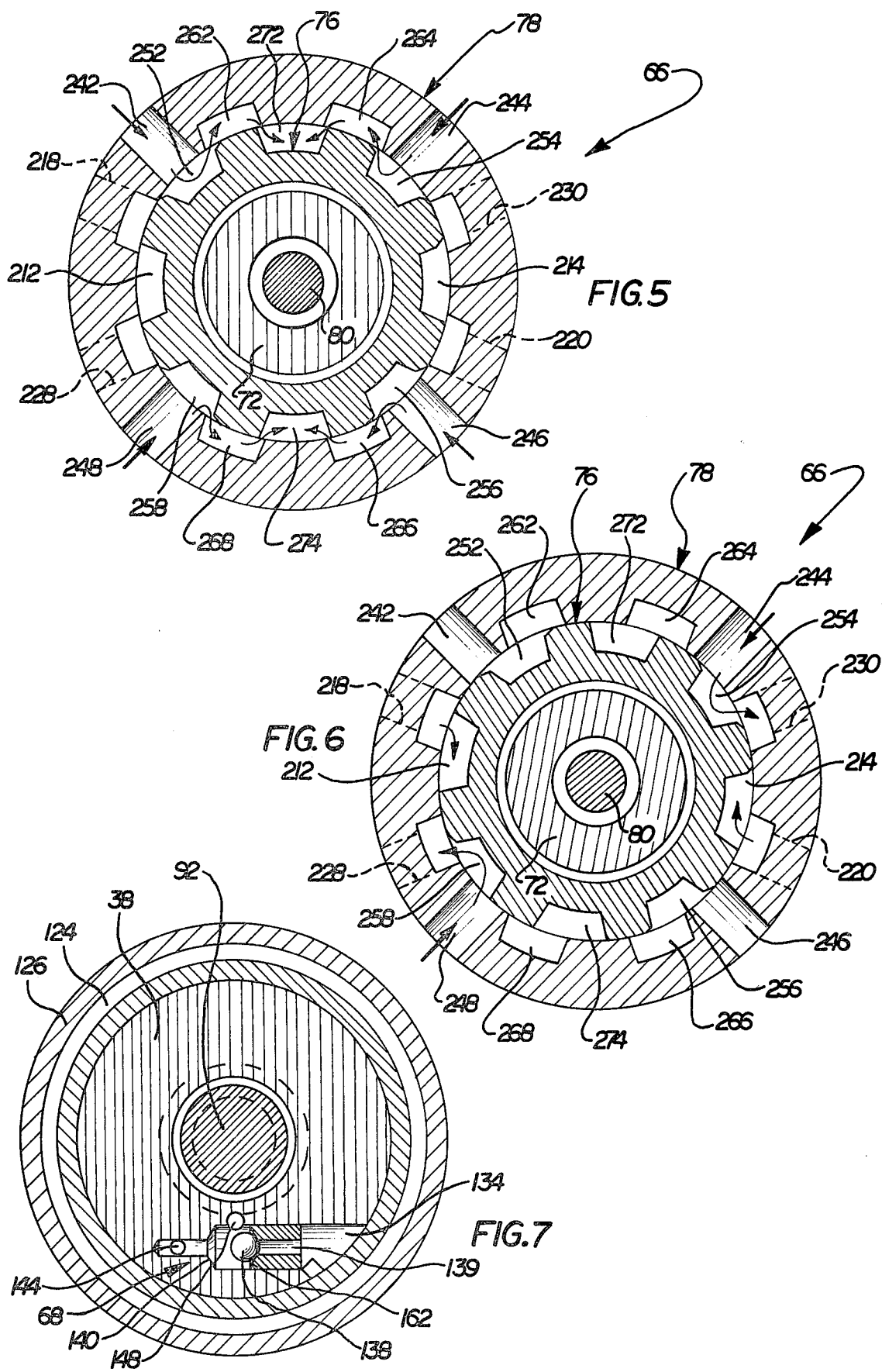

POWER STEERING CONTROL APPARATUS

BACKGROUND OF THE INVENTION

The present invention relates to a new and improved power steering apparatus.

A power steering apparatus is disclosed in U.S. patent application Ser. No. 386,907 filed June 10, 1982 by William T. Rabe and Maurice P. Roberts and entitled "Steering Apparatus", now U.S. Pat. No. 4,418,781. The steering apparatus disclosed in the foregoing application includes a power steering motor having a hollow piston rod which extends from only one side of a piston through a motor cylinder wall. Therefore, the head end working area of the piston is greater than the rod end working area of the piston. The head and rod end working areas of the piston are the surface areas on the head and rod ends of the piston projected into a plane extending perpendicular to a path along which the piston is movable under the influence of fluid pressure. When the fluid pressure to which the head or rod end of a piston is exposed is multiplied by the head or rod end working area of the piston, the result is equal to the force applied to the piston by the fluid pressure.

The steering apparatus disclosed in the aforementioned Rabe and Roberts United States patent compensates for the reduced cross sectional area of the rod end of the piston during operation of the motor by providing a compensator chamber inside the hollow piston rod. The compensator chamber has a working area on the rod end of the piston which is equal to the cross sectional area of the piston rod. A compensator valve assembly is mounted on the piston and directs fluid pressure to the compensator chamber whenever a steering control valve is actuated.

When the steering control valve of the apparatus disclosed in the aforementioned Rabe and Roberts United States patent is actuated to direct fluid pressure against the head end of the piston, the same fluid pressure is also applied against the compensator chamber working area on the rod end of the piston to offset a portion of the fluid pressure applied against the working area on the head end of the piston. As a result, the effective working area of the head end of the piston is equal to the working area on the rod end of the piston. Equal fluid pressure forces are thus applied to the piston during turns in opposite directions when the steering apparatus is subjected to the same operating conditions.

Although the compensator chamber disclosed in the aforementioned Rabe and Roberts United States patent is effective to equalize the rod and head end working areas of the piston during turns in opposite directions, the compensator chamber cannot equalize the rod and head end working areas of the piston when the power steering motor is in an inactive condition and there is a residual fluid pressure in the motor cylinder chambers. At this time, the rod end working area of the piston will be less than the head end working area of the piston by an amount equal to the cross sectional area of the piston rod. Therefore, when the motor is in an inactive condition, the residual fluid pressure in the head end motor cylinder chamber will apply a force against the piston which is greater than the force applied against the piston by the residual fluid pressure in the rod end motor cylinder chamber. This results in a tendency for the power steering motor to be actuated under the influence of the residual fluid pressure even though the steering control valve is in a neutral condition in which the power steering motor should be inactive.

BRIEF SUMMARY OF THE PRESENT INVENTION

The present invention eliminates the fluid pressure forces acting against opposite sides of a power steering motor piston when a power steering control valve is in a neutral or unactuated condition. The control valve is connected with three lines, a fluid supply conduit through which power steering fluid under pressure is supplied to the control valve, a fluid return conduit through which excess power steering fluid is returned to a reservoir, and a vent conduit through which there is substantially no flow when the steering control valve is in the neutral condition. The fluid pressure in the vent conduit is equal to atmospheric pressure.

When the steering control valve is in its neutral condition, it connects the vent conduit with the head and rod end chambers of the power steering motor. As a result, the head and rod end motor chambers are at atmospheric or zero gauge pressure. Therefore, there are no residual fluid pressure forces acting against the head and rod end working areas of the piston to tend to actuate the power steering motor when the steering control valve is in a neutral condition.

Accordingly, it is an object of this invention to provide a new and improved apparatus for turning steerable vehicle wheels and in which residual fluid pressure forces on opposite sides of a power steering motor piston are eliminated when a steering control valve is in a neutral or unactuated condition.

Another object of this invention is to provide a new and improved apparatus as set forth in the preceding object and wherein head and rod end working areas of the power steering motor piston are exposed to atmospheric pressure when the steering control valve is in the neutral condition.

Another object of this invention is to provide a new and improved apparatus for effecting turning movement of steerable vehicle wheels and in which a supply conduit conducts fluid at a first pressure to a power steering control valve, a return conduit conducts fluid from the control valve at a second pressure, and a vent conduit conducts to the control valve a third fluid pressure which is less than the first and second fluid pressures.

BRIEF DESCRIPTION OF THE DRAWINGS

The foregoing and other objects and features of the present invention will become more apparent upon a consideration of the following description taken in connection with the accompanying drawings wherein:

FIG. 1 is a schematic illustration of a power steering apparatus constructed in accordance with the present invention;

FIG. 2 is an enlarged sectional view illustrating the relationship between a power steering motor and a steering control valve of the power steering apparatus of FIG. 1;

FIG. 4 (on sheet one of the drawings) is an elevational plan view illustrating where fluid supply, return, and vent conduits are connected with a housing of the steering control valve of FIG. 3;

FIG. 5 is a sectional view, taken generally along the line 5—5 of FIG. 3 illustrating the power steering control valve in a neutral condition in which the vent conduit is in communication with motor cylinder chambers on opposite sides of a piston;

FIG. 6 is a sectional view, generally similar to FIG. 5, illustrating the steering control valve in an actuated condition in which the supply conduit is in communication with a head end motor cylinder chamber and the vent conduit is connected with a rod end motor cylinder chamber; and FIG. 7 is a sectional view taken generally along the line 7—7 of FIG. 2, illustrating the construction of a compensator or secondary control valve which is mounted on the piston of the power steering motor.

DESCRIPTION OF ONE SPECIFIC PREFERRED EMBODIMENT OF THE INVENTION

Figure 3:
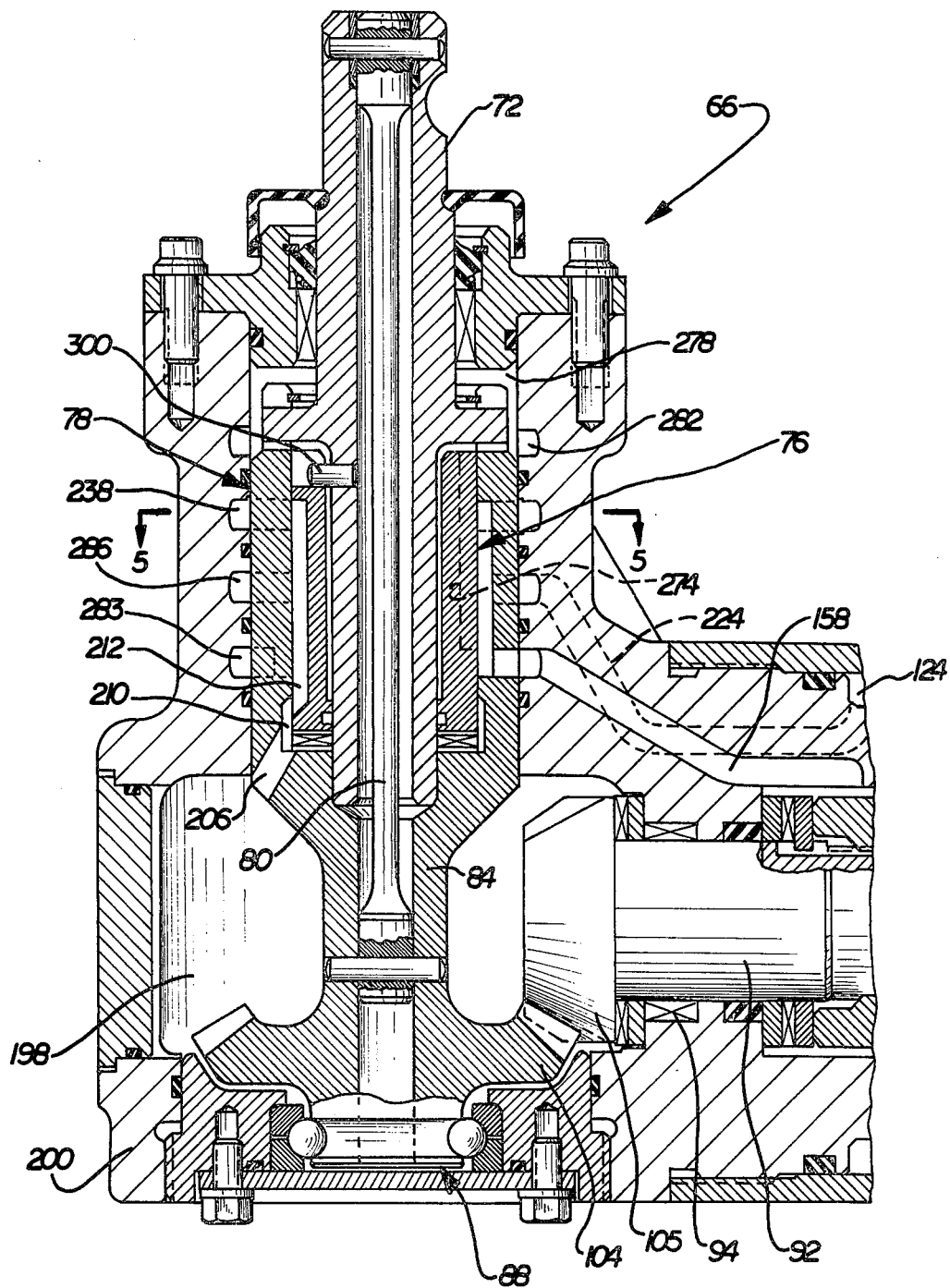
FIG. 3 is an enlarged fragmentary sectional view of the steering control valve of FIG. 2.

Steerable vehicle wheels 10 and 12 (see FIG. 1) are turned by a power steering apparatus 14 constructed in accordance with the present invention. The power steering apparatus 14 is connected with the wheels 10 and 12 in a known manner. Upon rotation of a steering wheel 18, the steering apparatus 14 turns steerable vehicle wheels 10 and 12.

Power steering fluid is supplied to the steering apparatus 14 from a power steering pump 22 through a supply conduit 24. When the power steering apparatus 14 is in an inactive condition, excess fluid supplied to the power steering apparatus from the pump 22 is returned to a reservoir or drain 28 through a return conduit 30. The reservoir or drain 28 is exposed to atmospheric pressure.

The steering apparatus 14 (see FIG. 2) includes a power steering motor 32 having a wall assembly 34 which defines a cylindrical main chamber 36. A generally cylindrical piston 38 is located in the main chamber 36 and divides it into a head end variable volume chamber 42 and a rod end variable volume chamber 44. A hollow cylindrical piston rod 48 is fixed to a rod end portion 50 of the piston 38 and extends through the variable volume chamber 44 and a circular opening in an end section 52 of the wall assembly 34. The outer end of the piston rod 48 is connected with a link 54 of the steering linkage 16 by a ball and socket joint 56. The ball and socket joint 56 cooperates with link 54 to hold the piston 38 and piston rod 48 against rotation about their common central axis. The end of the motor wall assembly 34 opposite the end section 52 is connected with an axle mounted bracket 58 by a second ball and socket joint assembly 60.

A control valve assembly 64 (FIG. 2) is provided to control the operation of the motor 32. The control valve assembly 64 includes a steering control valve 66 and a piston mounted compensator or secondary control valve 68. The steering control valve 66 directs high pressure fluid from the supply conduit 24 (FIG. 1) to the power steering motor 32 to effect turning movement of the steerable vehicle wheels 10 and 12 toward the left or the right.

The steering control valve 66 (FIG. 3) includes a rotatable input member 72 which is connected to and rotates with the steering wheel 18 (FIG. 1). An inner valve member or spool 76 (see FIG. 3) is fixed to the input member 72 by a pin 300 and is rotatable relative to an outer valve member or sleeve 78. The generally cylindrical valve sleeve 78 is connected with the valve spool 76 by an axially extending torsion bar 80 and a base 84. The base 84 is integrally formed with the valve sleeve 78 and is secured to one end of the torsion bar 80.

Upon rotation of the steering wheel 18 (FIG. 1), the input member 72 (FIG. 3) flexes the torsion bar 80 and rotates the inner valve member 76 through a short arcuate distance relative to the valve sleeve 78. The relative rotation between the inner valve member 76 and the valve sleeve 78 actuates the steering control valve 66. Actuation of the valve 66 ports high pressure fluid from the supply conduit 24 (FIG. 1) to one of the variable volume motor chambers 42 or 44 (FIG. 2) and connects the other variable volume chamber with the return conduit 30. This effects operation of the power steering motor 32 to turn the steerable vehicle wheels.

As the power steering motor 32 is operated, a feedback system 88 (FIG. 2) rotates the base 84 of the valve sleeve 78 to move the valve sleeve toward its initial or neutral position relative to the inner valve member 76. Once the power steering motor 32 has been operated to an extent corresponding to the extent of rotation of the steering wheel 18 and input member 72, the inner and outer valve members 76 and 78 are returned to their initial or neutral positions to interrupt operation of the steering motor. The feedback system 88 also provides a direct mechanical drive if the power steering pump 22 is ineffective to provide high pressure fluid to the motor 32.

The feedback system 88 includes a rotatable screw member 92 which extends through the piston 38 (FIG. 2) into a telescopic relationship with the hollow cylindrical piston rod 48. The screw member 92 is supported for rotation and held against axial movement by a bearing assembly 94. The screw member 92 is has an external thread convolution 98 which is engaged by a recirculating ball nut 100 in the piston 38. Due to the interaction between the recirculating ball nut 100 and the external thread convolution 98, axial movement of the piston 38 causes the screw member 92 to be rotated to an extent which varies as a function of the extent of movement of the piston relative to the wall assembly 34. Bevel gears 104 and 105 in the feedback linkage 88 transmit the rotary motion of the screw member 92 to the outer valve member 78. The outer valve member 78 is thus rotated relative to the inner valve member 76 to an extent which corresponds to the extent of axial movement of the piston 38. The screw member 92, gears 104 and 105 and steering control valve 66 cooperate in the same general manner as disclosed in U.S. Pat. No. 3,918,544.

An annular compensator or secondary chamber 106 (see FIG. 2) extends axially along the screw member 92. One end of the compensator chamber 106 is provided by a seal 108 between the ball nut 100 and the screw member 92. The seal 108 extends into the root of the external thread convolution 98 to block fluid leakage from the head end variable volume chamber 42 along the screw member 92 into the compensator chamber 106. The other end of the compensator chamber 106 is provided by an annular sealing wall 110 on the outer end portion of the screw member 92. The compensator chamber 106 is further defined by a cylindrical inner surface 114 of the piston rod 48, an inner surface of the ball nut 100, and the outer surface of the screw member 92. Air can exhaust from the interior of the piston rod 48 through a vent plug 115.

The compensator chamber 106 is sized so that it has a working area on a rod end portion 50 of the piston 38 equal to the cross sectional area of a tubular wall 120 of the piston rod 48. Specifically, the compensator chamber working area is equal to the annular area between a cylindrical inner side surface 152 of the tubular piston rod wall 120 and a maximum major diameter surface portion of the screw member 92. The working area of the compensator chamber 106 is annular, as projected on a plane indicated at A—A in FIG. 2. The plane A—A extends perpendicular to the central axis of the piston rod 48 and the path of movement of the piston 38 in the chamber 36.

The left side, head end working area of the piston 38 is equal to the annular surface area of head end 121 defined by the outside diameter of the piston 38 and the outside diameter of the screw 92.

The head end working area of the piston 38 is equal to the surface area of the head end portion 121 projected onto the plane A—A. The rod end working area of the piston 38 is equal to the surface area of the rod end 50 of the piston outside of the piston rod 48 projected onto the plane A—A. When the fluid pressure to which the head end 121 or rod end 50 of the piston 38 is exposed is multiplied by the head or rod end working surface area, the result is equal to the force applied to the head or rod end of the piston 38 by the fluid pressure. In the present instance, the head end 121 of the piston 38 has a working area which exceeds the working area of the rod end 50 of the piston by an amount equal to twice the annular cross sectional area of the tubular wall 120 of the piston rod 48.

When the steering control valve 66 is actuated to port high pressure fluid to the variable volume chamber 42 and apply pressure to the head end 121 of the piston 38, the compensator valve 68 conducts fluid pressure from the variable volume chamber 42 to the compensator or secondary chamber 106 (FIG. 2). The fluid pressure force applied to the rod end 50 of the piston 38 by the fluid in the compensator chamber 106 opposes the fluid pressure force applied against the head end 121 of the piston. Since the working area of the compensator chamber 106 is equal to the cross sectional area of the tubular piston rod wall 120, the head end working area of the piston 38 is effectively decreased by an amount corresponding to the cross sectional area of the piston rod wall.

When the steering control valve 66 is actuated to port high pressure fluid to the rod end of the variable volume chamber 44, the compensator valve 68 directs the high pressure fluid to the compensator chamber 106. Since the compensator chamber working area is on the rod end of the piston 38, the total working area on the rod end of the piston is equal to the working area exposed to the fluid pressure in the variable volume chamber 44 plus the working area exposed to the fluid pressure in the compensator chamber 106.

During turns in which high pressure fluid is directed to the head end of the variable volume chamber 42 of the power steering motor 32, the working area on the head end of the piston 38 is effectively reduced by the working area of the compensator chamber 106. During turns in which high pressure fluid is directed to the rod end variable volume chamber 44 of the power steering motor 32, the rod end working area of the piston is effectively increased by the working area in the compensator chamber 106. Because the working area in the compensator chamber 106 is equal to the annular cross sectional area of the piston rod 120, the effective rod end and head end working areas of the piston 38 are equal or balanced during turns in opposite directions.

Upon rotation of the steering wheel 18 and actuation of the steering control valve 66 to turn the steerable vehicle wheels 10 and 12 (FIG. 1) toward the right, high pressure fluid is directed from the steering control valve 66 to a passage 124 (FIG. 2) formed in a cylindrical wall 126 of the wall assembly 34. The fluid is conducted to an outlet 128 that opens into the right (as viewed in FIG. 2) end of the variable volume chamber 44. The fluid pressure is applied to the annular rod end portion 50 of the piston 38 outside of the piston rod 48. The head end variable volume chamber 42 is connected with the reservoir 28 through a passage 158 (FIGS. 2 and 3) and the steering control valve 66.

The high pressure fluid in the variable volume chamber 44 is also conducted through a passage 134 (FIG. 7) formed in the piston 38 to the compensator or secondary valve 68. Although the passage 134 is shown in FIG. 7 only as extending radially outwardly to the inner circumferential surface of the cylindrical wall 126, the passage 134 also extends axially along the piston 38 from the cylindrical chamber 44 (FIG. 2) to the compensator valve 68.

The compensator valve 68 is mounted in the piston 28 and includes a spherical ball valve member 138 (FIG. 7). The fluid pressure conducted through the passage 135 flows through a passage 139 to press the ball valve member 138 against a conical valve seat 140 formed in the piston 38. The valve member 138 thereby blocks fluid flow through a second axial passage 144 (see FIGS. 2 and 7) formed in the piston 38 and connected with the variable variable volume motor chamber 42.

The high pressure fluid from the rod end variable volume motor chamber 44 flows through the actuated compensator valve 68 into a passage 148 (see FIGS. 2 and 7). The passage 148 extends axially through the piston 28 from the compensator valve 68 to the compensator chamber 106 (FIG. 2) disposed within the hollow piston rod 48. Therefore, the fluid pressure in the compensator chamber 106 is applied against the piston 38 and the seal 108 to urge the piston toward the left (as viewed in FIG. 2).

When the steering control valve 66 is actuated to port high pressure fluid to the rod end of the variable volume chamber 44, the effective working area of the rod end portion of the piston 38 which is exposed to high pressure fluid is thus equal to the sum of (a) the rod end working annular area of the piston 38 and (b) the annular working area of the compensator chamber 106.

Upon rotation of the steering wheel 18 to turn the steerable vehicle wheels 10 and 12 toward the left, the steering control valve 66 is actuated to port high pressure fluid to the head end variable volume chamber 42 through the passage 158. The steering control valve 66 also connects the rod end variable volume chamber 44 to the reservoir 28.

The high pressure fluid in the head end variable volume chamber 42 is conducted through the axially extending piston passage 144 (FIG. 2) to the compensator valve 68. The fluid pressure urges the ball valve member 138 against the valve seat 162 as shown in FIG. 7, to block fluid flow from the variable volume chamber 44 through the compensator valve 68. The head end variable volume chamber 42 is thus connected with the compensator chamber 106 through the passage 144, the compensator valve 68 and the passage 148. As a result, a high fluid pressure acts against the compensator chamber working area on the rod end of the piston 38.

The fluid pressure acting against the compensator chamber working area opposes movement of the piston 28 toward the right (as viewed in FIG. 2). Nonetheless, fluid pressure against the larger working area of the head end portion of the piston 38 is effective to move the piston toward the right (as viewed in FIG. 2) against the fluid pressure in the compensator chamber 106. As the piston 38 moves toward the right, the volume of the compensator chamber 106 decreases and fluid flows from the compensator chamber 106 through the compensator valve 68 to the head end variable volume chamber 42.

Since the working area of the compensator chamber 106 is equal to the cross sectional area of the tubular wall 120 of the piston rod 48, the effective working area of the head end portion of the piston which is exposed to high pressure fluid is equal to the difference between (a) the head end working area and (b) the working area of the compensator chamber. The effective head end working area is also equal to the sum of (a) the rod end working area and (b) the working area of the compensator chamber. By thus equalizing the working areas during right and left turns, the net fluid pressure force urging the piston 38 toward the left (as viewed in FIG. 2) during a right turn is equal to the fluid pressure force urging the piston toward the right (as viewed in FIG. 2) during a left turn if the vehicle operating conditions are the same. The equalization of steering forces during turns in opposite directions tends to provide an identical level of steering effort in each direction of turn.

Although the cooperation between the compensator valve 68 and compensator chamber 106 is effective to equalize the high pressure forces applied against the piston 38 during turns in opposite directions, the compensator valve 68 and chamber 106 are ineffective to equalize the forces applied in opposite directions against the piston 38 as the result of residual pressures in the motor cylinder chambers 42 and 44 when the motor 32 is in an inactive condition. Thus, if a residual pressure remains in the motor cylinder chambers 42 and 44 and the compensator chamber 106 when the motor 32 is not being operated to turn the steerable vehicle wheels 10 and 12, the residual fluid pressure acting against the relatively large head end working area of the piston 38 will urge the piston toward the right (as viewed in FIG. 2) against the influence of the force resulting from the application of the residual pressure against the rod end and compensator chamber working areas of the piston. This is because the head end working area exceeds the combined rod end and compensator chamber working areas by the cross sectional area of the tubular wall 120 of the piston rod 48. This results in the residual fluid pressure in the motor cylinder chamber 42 moving the piston 38 toward the right even though the steering control valve 66 is in an unactuated or neutral condition.

With known power steering systems, the residual fluid pressures result from the motor cylinder chambers 42 and 44 being connected with a reservoir through a fluid return conduit. The various valves and fittings in the passage to the reservoir cause a pressure drop in the fluid return conduit of from 40 to 90 psi between the motor cylinder chambers 42 and 44 and the reservoir 28. In addition, there is a continuous flow of fluid from the steering control valve back to the reservoir through the fluid return conduit 30 when an open center control valve of a known power steering system is in an unactuated or neutral condition.

In accordance with a feature of the present invention, the fluid pressure forces on opposite sides of the piston 38 are eliminated when steering control valve 66 and the power steering motor 32 are in an inactive condition. Since the working area of the head end portion 121 of the piston 38 exceeds the working area on the rod end portion 50 of the piston, merely equalizing the residual fluid pressure exerted against the piston 38 when the motor 32 is in an inactive condition results in the piston 38 moving toward the right (as viewed in FIG. 2). Therefore, the residual fluid pressure must be eliminated to prevent rightward movement (as viewed in FIG. 2) of the piston 38.

Elimination of the residual fluid pressure and resultant forces is accomplished by venting the motor cylinder chambers 42 and 44 and the compensator chamber 106 to atmospheric pressure when the steering control valve 66 is in a neutral or unactuated condition. As a result, there is zero gauge pressure in the motor cylinder chambers 42 and 44 and compensator chamber 106. Therefore there is no effective fluid pressure forces acting against the piston 38. The power steering motor is totally inactive and does not tend to operate under the influence of residual fluid pressure forces.

To enable the motor cylinder chambers 42 and 44 to be vented to atmospheric pressure, a conduit 194 (see FIG. 1) connects the steering control valve 66 with the reservoir 28. When the steering control valve 66 is in a neutral or unactuated condition, fluid from the pump 22 flows through the supply conduit 24 to the control valve and from the control valve back to the reservoir 28 through the return conduit 30. There is no flow through the vent conduit 194. However, the vent conduit 194 is connected in fluid communication with the motor cylinder chambers 42 and 44 (see FIG. 2) through the control valve 66.

Since there is no flow through the vent conduit 194 when the control valve 66 is in the neutral condition, there is no fluid pressure drop through the control valve 66 and along the vent conduit 194. Therefore the motor cylinder chambers 42 and 44 are exposed to the fluid pressure at the reservoir 28, that is atmospheric pressure. Thus, when the steering control valve 66 is in the neutral or unactuated condition, fluid at a relatively high pressure flows through the supply conduit 24 to the steering control valve 66. Fluid at a lower pressure flows back from the steering control valve 66 to the reservoir 28 through the return conduit 30. The fluid in the vent conduit 194 is at atmospheric pressure, which is substantially lower than the fluid pressure in the return conduit 30.

The atmospheric pressure in the vent conduit 194 is conducted through the unactuated steering control valve 66 to the motor cylinder chambers 42 and 44. The compensator valve 68 conducts the atmospheric pressure to the compensator chamber 106. A chamber 198 in the valve housing 200 (see FIG. 3), which also contains the bevel gears 104 and 105, is connected in communication with the vent conduit 194 through a port 202 (see FIG. 4) formed in the housing 200. A passage 206 (FIG. 3) in the base of the valve sleeve 78 connects the vent chamber 198 in fluid communication with an annular manifold groove 210 formed inside the valve sleeve 78 and circumscribing the lower end portion of the valve spool 76 (FIG. 3). The annular manifold groove 210 communicates with a pair of diametrically opposed, longitudinally extending vent grooves or slots 212 and 214 (FIG. 5).

When the steering control valve 66 is in the neutral or unactuated condition illustrated in FIGS. 3 and 5, a pair of diametrically opposite motor cylinder ports 218 and 220 (FIG. 5) are connected in fluid communication with the vent grooves 212 and 214 formed in the valve spool 76 (see FIG. 5). The motor cylinder ports 218 and 220 communicate with a passage 224 formed in the valve housing 200 (see FIG. 3). The passage 224 is connected in fluid communication with the passage 124 leading to the right (as viewed in FIG. 2) motor cylinder chamber 44.

Similarly, a pair of diametrically opposed motor cylinder ports 228 and 230 (FIG. 5) formed in the valve sleeve 78 are connected in fluid communication with the vent grooves 212 and 214 in the valve spool 76. The motor ports 228 and 230 are connected in fluid communication with the left (as viewed in FIG. 2) motor chamber 42 through the passage 158 (FIG. 3) in the valve housing 200.

As described above, when the control valve 66 is in the neutral or unactuated condition illustrated in FIGS. 3 and 5, the motor cylinder chambers 42 and 44 are connected in fluid communication with the vent conduit 194 (FIG. 1). There is substantially no fluid flow through the vent conduit 194, and atmospheric or zero gauge pressure is present in both of the motor cylinder chambers 42 and 44. Since the entire steering motor 32 is exposed to atmospheric pressure, the atmospheric pressure in the motor cylinder chambers 42 and 44 is ineffective to move the piston 38 even though the head end of the piston has a greater working area than the rod end.

When the control valve 66 is in the neutral condition illustrated in FIGS. 3 and 5, high pressure fluid is conducted from the supply conduit 24 to a port 234 (see FIG. 4) in the housing 200. The high pressure fluid flows from the port 234 to an annular groove 238 (see FIG. 3) which is formed in the housing 200 and circumscribes the valve sleeve 78. A plurality of radially extending passages 242, 244, 246, and 248 (see FIG. 5) in the valve spool 78 connected the annular groove 238 in fluid communication with axially extending grooves or slots 252, 254, 256, and 258 (FIG. 5) formed in the valve spool 76. Fluid flow from the slots 252-258 to the motor cylinder ports 218, 220, 228 and 230 is blocked by the valve spool 76. However, a plurality of axially extending grooves 262, 264, 266 and 268 (FIG. 5) in the valve sleeve 78 connect the slots 252-258 in fluid communication with axial grooves 272 and 274 which extend upwardly (as viewed in FIG. 3) along the valve spool 76 to fluid return chamber 278 (FIG. 3) at the upper end of the valve sleeve 78.

The fluid return chamber 278 is connected in fluid communication with the return fluid conduit 30 (FIG. 1) through a groove 282 (FIG. 3) and a port 284 (FIG. 4) formed in the housing 200. Thus, when the steering control valve 66 is in the neutral or unactuated condition of FIGS. 3 and 5, high pressure fluid from the supply conduit 24 is conducted through the pressure ports 242, 244, 246, and 248 in the valve sleeve 78 to the axially extending return grooves or slots 272 and 274 in the valve spool 76. The return grooves 272 and 274 are connected in fluid communication with the fluid return chamber 278 and conduit 30.

Upon actuation of the steering control valve to pressurize the head end motor cylinder chamber 42, the input member 72 and valve spool 76 are rotated in an clockwise direction from the position shown in FIG. 5 to the position shown in FIG. 6. As a result, the inlet port 244 is connected in fluid communication with the motor port 230 through groove 254. Inlet port 248 is likewise connected in fluid communication with motor port 228 through groove 258. The motor ports 228 and 230 are connected in fluid communication with an annular groove 283 (FIG. 3) formed in the housing 200. The annular groove 283 is in turn connected in fluid communication with the head end motor chamber 42 through the housing passage 158. Therefore, the actuated steering control valve 66 directs high pressure fluid from the supply conduit 24 (see FIG. 1) through the inlet ports 244 and 248 and motor ports 230 and 228 to the head end chamber 42 to effect movement of the piston 38 toward the right (as viewed in FIG. 2).

As the piston moves toward the right, the rod end motor cylinder chamber 44 is contracted and fluid is exhausted through the passages 124 and 224 (FIG. 2) to the control valve 66. The passage 224 is connected with an annular groove 286 (see FIG. 3) which circumscribes the valve sleeve 78. The annular groove 286 is connected in fluid communication with the motor ports 218 and 220 (see FIG. 6) formed in the valve sleeve 78. The motor cylinder ports 218 and 220 are connected in fluid communication with the axially extending vent slots or grooves 212 and 214 formed in the valve spool 76. The grooves 212 and 214 are connected in communication with the vent chamber 198 through the manifold groove 210 and passage 206 formed in the valve sleeve 78. Therefore, fluid which is exhausted from the rod end motor cylinder chamber is conducted to the reservoir 28 through the actuated control valve 66 and the vent conduit 194. When the valve 66 is in the actuated condition of FIG. 6, fluid flow through the return slots or grooves 272 and 274 in the valve spool 76 is blocked so that there is no fluid flow through the fluid return conduit 30.

Upon actuation of the control valve 66 to pressurize the rod end motor cylinder chamber 44, the input member 72 is rotated in a counterclockwise direction (as viewed in FIG. 5). This results in counterclockwise (as viewed in FIG. 5) rotation of the valve spool 76 relative to the valve sleeve 78. The motor cylinder ports 218 and 220 are then connected in fluid communication with fluid supply or inlet ports 242 and 246. Fluid flows from the supply conduit 24 (FIG. 1) through the fluid inlet ports 242 and 246 to the motor cylinder ports 218 and 220. The motor cylinder ports 218 and 220 are connected in fluid communication with the annular groove 286 (FIG. 3) and passages 224 and 124 (FIG. 2) leading to the rod end motor cylinder chamber 44. The motor cylinder ports 228 and 230 (FIG. 5) are connected in fluid communication with the vent grooves or slots 212 and 214 formed in the valve spool 76. Therefore, fluid is exhausted from the head end motor cylinder chamber 42 to the vent conduit 194 through the control valve 66.

In view of the foregoing, it will be apparent that the present invention eliminates fluid pressure forces against opposite sides of a power steering motor piston 38 when a power steering control valve 66 is in a neutral or unactuated condition. The control valve 66 is connected with three lines, a fluid supply line 24 through which power steering fluid under pressure is supplied to the control valve, a fluid return line 30 through which excess power steering fluid is returned to a reservoir 28, and a vent line 194 through which there is substantially no flow when the steering control valve 66 is in the neutral condition. The fluid pressure in the vent line 194 is equal to atmospheric pressure.

When the steering control valve 66 is in the neutral condition, it connects the vent conduit 194 with head and rod end chambers 42 and 44 of the power steering motor 38. This results in the head and rod end motor chambers 42 and 44 being at atmospheric or zero gauge pressure. Therefore, there are no residual fluid pressure forces against the head and rod end working areas of the piston 38 to tend to actuate the power steering motor 32 when the steering control valve 66 is in a neutral condition (FIG. 5).

In the illustrated embodiment of the invention, the power steering control valve 66 is connected with atmospheric pressure in the reservoir 28 through the vent conduit 194. However, the power steering control valve 66 could be connected with a source of atmospheric pressure by means other than the vent conduit 194. For example, the housing chamber 198 could be vented directly to atmospheric pressure. In addition, a power steering apparatus 14 according to the present invention could have a motor construction other than the specific construction of the motor 32 and a power steering valve construction other than the specific construction of the power steering valve 66.

What is claimed is:

1. A power steering apparatus for effecting turning movement of steerable vehicle wheels, said apparatus comprising
motor means operable to effect turning movement of the steerable vehicle wheels, said motor means including first and second motor chambers,
control valve means operable from a neutral condition in which said motor means is inactive to a first actuated condition to direct fluid pressure to said first motor chamber to effect operation of said motor means to turn the steerable vehicle wheels in a first direction, said control valve means being operable from the neutral condition to a second actuated condition to direct fluid pressure to said second motor chamber to effect operation of said motor means to turn the steerable vehicle wheels in a second direction,
supply conduit means for conducting fluid from a source of fluid to said control valve means at a first pressure,
return conduit means for conducting fluid from said control valve means at a second pressure when said control valve means is in the neutral condition, and
vent conduit means for conducting to said control valve means a third fluid pressure which is less than said first and second fluid pressures and through which there is substantially no fluid flow when said control valve means is in the neutral condition,
said control valve means connecting said vent conduit means in fluid communication with said first and second motor cylinder chambers and connecting said supply conduit means in fluid communication with said return conduit means when said control valve means is in the neutral condition,
said control valve means blocking fluid communication between said vent conduit means and said supply conduit means and blocking fluid communication between said vent conduit means and said return conduit means when said control valve means is in the neutral condition so that the fluid pressure in said first and second motor cylinder chambers is less than said first and second fluid pressures when said control valve means is in the neutral condition.

2. A power steering apparatus as set forth in claim 1 wherein said motor means includes a wall means for defining a main chamber, a piston disposed in said main chamber and dividing said main chamber into said first and second motor chambers, a piston rod connected with a first end portion of said piston and extending through said first motor chamber and said wall means, said first end portion of said piston having a first working area exposed to the fluid pressure in said first motor chamber, said piston having a second end portion with a second working area which is exposed to the fluid pressure in said second motor chamber and which is greater than said first working area.

3. An apparatus as set forth in claim 2 wherein the control valve means connects said vent conduit means in fluid communication with one of said motor chambers and connects said supply conduit means in fluid communication with the other one of said motor chambers upon operation of said control valve means to either of said actuated conditions.

4. An apparatus as set forth in claim 2 wherein said third pressure is substantially equal to atmospheric pressure.

5. A steering apparatus for use in turning steerable vehicle wheels, said apparatus comprising
wall means for defining a main chamber,
a piston disposed within said main chamber and dividing said main chamber into first and second variable volume chambers,
a piston rod connected with one side of said piston and extending outwardly from only said one side of said piston through said second variable volume chamber and said wall means, said piston rod being adapted to be connected with the steerable vehicle wheels,
control valve means operable between an unactuated condition and first and second actuated conditions to control fluid flow to and from said first and second variable volume chambers,
supply conduit means for conducting high pressure fluid from a source of fluid to said control valve means, and
vent means for conducting atmospheric pressure to said control valve means,
said control valve means including surface means for (i) directing high pressure fluid from said supply conduit means to said first variable volume chamber when said control valve means is in the first actuated condition to effect relative movement between said wall means and said piston in a first direction to turn the steerable vehicle wheels in one direction, (ii) directing high pressure fluid from said supply conduit means to said second variable volume chamber when said control valve means is in the second actuated condition to effect relative movement between said wall means and said piston in a second direction to turn the steerable vehicle wheels in a direction opposite to the one direction, and (iii) connecting said first and second variable volume chambers in fluid communication with said vent means and blocking fluid communication between said supply conduit means and said first and second variable volume chambers to eliminate fluid pressure forces against said piston when said control valve means is in the unactuated condition.

6. A steering apparatus for use in turning steerable vehicle wheels, said apparatus comprising
wall means for defining a main chamber, a piston disposed within said main chamber and dividing said main chamber into first and second variable a piston rod connected with one side of said piston and extending outwardly from only said one side of said piston through said second variable volume chamber and said wall means, said piston rod being adapted to be connected with the steerable vehicle wheels, control valve means operable between an unactuated condition and first and second actuated conditions to control fluid flow to and from said first and second variable volume chambers, a rotatable screw member, means connecting said screw member with said piston for rotating said screw member to an extent which varies as a function of the extent of relative axial movement between said piston and said wall means, means for connecting said screw member with said control valve means to operate said control valve means from one of the actuated conditions toward the unactuated condition upon relative movement between said piston and said wall means, supply conduit means for conducting high pressure fluid from a source of fluid to said control valve means, and vent means for conducting atmospheric pressure to said control valve means, said control valve means including surface means for (i) directing high pressure fluid from said supply conduit means to said first variable volume chamber when said control valve means is in the first actuated condition to effect relative movement between said wall means and said piston in a first direction to turn the steerable vehicle wheels in one direction, (ii) directing high pressure fluid from said supply conduit means to said second variable volume chamber when said control valve means is in the second actuated condition to effect relative movement between said wall means and said piston in a second direction to turn the steerable vehicle wheels in a direction opposite to the one direction, and (iii) connecting said first and second variable volume chambers in fluid communication with said vent means and blocking fluid communication between said supply conduit means and said first and second variable volume chambers to eliminate fluid pressure forces against said piston when said control valve means is in the unactuated condition.

7. An apparatus as set forth in claim 6 wherein said piston rod is hollow and said screw member extends into said piston rod with a space between a longitudinally extending side of said screw member and an inner surface of said piston rod, means extending between said screw member and the inner surface of the piston rod to form one end of a pressure chamber that is disposed within said piston rod and that extends axially along said screw member from the one end of the pressure chamber toward said piston, and second valve means for directing fluid pressure from said first variable volume chamber to said pressure chamber upon actuation of said control valve means to the first actuated condition and for directing fluid pressure from said second variable volume chamber to said pressure chamber upon operation of said control valve means to the second actuated condition, said second valve means being effective to direct atmospheric fluid pressure to said pressure chamber upon operation of said control valve means to the unactuated condition.

8. An apparatus as set forth in claim 7 wherein said second valve means is disposed on said piston.

9. An apparatus as set forth in claim 7 wherein said screw member has an external thread convolution extending along said screw member, said apparatus further including a seal member extending between said piston and said external thread convolution on said screw member to form a second end of said pressure chamber.

10. An apparatus as set forth in claim 6 wherein said control valve means directs fluid flow from said second variable volume chamber to said vent means when said control valve means is in the first actuated condition and directs fluid flow from said first variable volume chamber to said vent means when said control valve means is in the second actuated condition.

11. An apparatus as set forth in claim 6 further including return conduit means for conducting fluid flow from said control valve means when said control valve means is in the unactuated condition, said surface means including means for blocking fluid communication between said vent means and said return conduit means when said control valve means is in the unactuated condition.

12. An apparatus for use in turning steerable vehicle wheels, said apparatus comprising wall means for defining a chamber, a piston disposed in said chamber and having first and second end portions, said first end portion of said piston having a first working area, a hollow piston rod connected to said second end portion of said piston, said second end portion of said piston having a second working area disposed outside of said piston rod and a third working area at least partially enclosed by said piston rod, the difference in area between said first and third working areas being equal to the sum of said second and third working areas, and valve means operable from a neutral condition to a first actuated condition to direct fluid pressure against said first and third working areas to effect turning movement of the steerable vehicle wheels in a first direction, said valve means being operable from the neutral condition to a second actuated condition to direct fluid pressure against said second and third working areas to effect turning movement of the steerable vehicle wheels in a second direction, said valve means being operable from the first and second actuated conditions to the neutral condition to direct atmospheric pressure against said first, second and third working areas.

13. An apparatus as set forth in claim 12 further comprising surface means disposed within said piston rod and cooperating with an inner side surface of said piston rod and said third working area to at least partially define a secondary chamber, said piston and piston rod being axially movable relative to said surface means to vary the volume of said secondary chamber upon operation of said valve means to either of said actuated conditions.

14. An apparatus as set forth in claim 12 wherein said piston rod includes a tubular wall portion, said tubular wall portion of said piston rod having a cross sectional area in a plane extending perpendicular to a central axis of said piston rod equal to said third working area.

15. An apparatus as set forth in claim 12 wherein said valve means includes a steering control valve assembly which directs fluid pressure against said first working area of said piston upon operation of said valve means to the first actuated condition and directs fluid pressure against said second working area of said piston upon operation of said valve means to said second actuated condition and a secondary control valve assembly which is actuated under the influence of fluid pressure conducted from said steering control valve assembly to direct fluid pressure against said thrd working area upon actuation of said valve means to either said first actuated condition or said second actuated condition.

16. An apparatus as set forth in claim 12 further including supply conduit means for conducting fluid from a source of fluid to said control valve means at a first pressure, return conduit means for conducting fluid from said control valve means at a second pressure when said control valve means is in the neutral condition, and vent conduit means for conducting atmospheric pressure which is less than said first and second pressures to said control valve means when said control valve means is in the neutral condition.

17. An apparatus as set forth in claim 12 wherein said valve means includes a steering control valve assembly which directs fluid pressure against said first working area of said piston upon operation of said valve means to the first actuated condition and directs fluid pressure against said second working area of said piston upon operation of said valve means to said second actuated condition, and directs atmospheric pressure against said first and second working areas of said piston upon operation of said valve means to the neutral condition, and a secondary control valve assembly which is actuated under the influence of fluid pressure conducted from said steering control valve assembly to direct fluid pressure against said third working area upon actuation of said valve means to either said first actuated condition or said second actuated condition, and which directs atmospheric pressure against said third working area upon actuation of said valve means to the neutral condition.

18. A steering apparatus for use in turning steerable vehicle wheels, said apparatus comprising
wall means for defining a main chamber,
a piston disposed within said main chamber and dividing said main chamber into first and second variable volume chambers,
a piston rod connected with one side of said piston and extending outwardly from only said one side of said piston through said second variable volume chamber and said wall means, said piston rod being adapted to be connected with the steerable vehicle wheels,
control valve means operable between an unactuated condition and first and second actuated conditions to control fluid flow to and from said first and second variable volume chambers,
supply conduit means for conducting high pressure fluid from a source of fluid to said control valve means,
return conduit means extending between said control valve means and the reservoir,
vent means for conducting atmospheric pressure to said control valve means, said vent means including vent conduit means extending between said control valve means and a fluid reservoir,
said control valve means including surface means for (i) directing high pressure fluid from said supply conduit means to said first variable volume chamber when said control valve means is in the first actuated condition to effect relative movement between said wall means and said piston in a first direction to turn the steerable vehicle wheels in one direction, (ii) directing high pressure fluid from said supply conduit means to said second variable volume chamber when said control valve means is in the second actuated condition to effect relative movement between said wall means and said piston in a second direction to turn the steerable vehicle wheels in a direction opposite to the one direction, and (iii) connecting said first and second variable volume chambers in fluid communication with said vent means, directing fluid flow from said supply conduit means to said return conduit means, and blocking fluid communication between said supply conduit means and said first and second variable volume chambers to eliminate fluid pressure forces against said piston when said control valve means is in the unactuated condition.

19. An apparatus as set forth in claim 18 wherein said piston rod is hollow and at least partially defines a pressure chamber, and second valve means for directing fluid pressure from said first variable volume chamber to said pressure chamber upon actuation of said control valve means to the first actuated condition and for directing fluid pressure from said second variable volume chamber to said pressure chamber upon operation of said control valve means to the second actuated condition, said second valve means being effective to direct atmospheric fluid pressure to said pressure chamber upon operation of said control valve means to the unactuated condition.

20. An apparatus as set forth in claim 19 wherein said second valve means is disposed on said piston.

21. A power steering apparatus for effecting turning movement of steerable vehicle wheels, said apparatus comprising
motor means operable to effect turning movement of the steerable vehicle wheels, said motor means including first and second motor chambers,
control valve means operable from a neutral condition in which said motor means is inactive to a first actuated condition to direct fluid pressure to said first motor chamber to effect operation of said motor means to turn the steerable vehicle wheels in a first direction, said control valve means being operable from the neutral condition to a second actuated condition to direct fluid pressure to said second motor chamber to effect operation of said motor means to turn the steerable vehicle wheels in a second direction,
supply conduit means for conducting fluid from a source of fluid to said control valve means at a first pressure when said control valve means is in the neutral condition, and
return conduit means for conducting fluid from said control valve means at a second pressure when said control valve means is in the neutral condition, said second pressure being less than the first pressure and greater than atmospheric pressure,
said control valve means including first surface means for blocking fluid communication between first and second motor cylinder chambers and said supply and return conduit means when said control valve means is in the neutral condition,
said control valve means including second surface means for venting said first and second motor cylinder chambers to atmospheric pressure when said control valve means is in the neutral condition.

* * * * *

UNITED STATES PATENT AND TRADEMARK OFFICE
CERTIFICATE OF CORRECTION

PATENT NO. : 4,475,440
DATED : October 9, 1984
INVENTOR(S) : William T. Rabe and Jim L. Rau It is certified that error appears in the above-identified patent and that said Letters Patent are hereby corrected as shown below:

Column 13, line 3, after "variable" insert - - volume chambers, - -.

Signed and Sealed this

Second Day of April 1985

[SEAL]

Attest:

DONALD J. QUIGG

*Attesting Officer*   *Acting Commissioner of Patents and Trademarks*